(12) United States Patent
Kemmer et al.

(10) Patent No.: US 10,991,962 B2
(45) Date of Patent: Apr. 27, 2021

(54) INTRINSICALLY SAFE BLEED-DOWN CIRCUIT AND CONTROL STRATEGY FOR FUEL CELL SYSTEMS

(71) Applicant: Robert Bosch GmbH, Stuttgart (DE)

(72) Inventors: Helerson Kemmer, Vaihingen (DE); Werner Belschner, Michelbach an der Bilz (DE)

(73) Assignee: Robert Bosch GmbH, Stuttgart (DE)

( * ) Notice: Subject to any disclaimer, the term of this patent is extended or adjusted under 35 U.S.C. 154(b) by 1001 days.

(21) Appl. No.: 15/532,133

(22) PCT Filed: Oct. 5, 2015

(86) PCT No.: PCT/EP2015/072894
§ 371 (c)(1),
(2) Date: Jun. 1, 2017

(87) PCT Pub. No.: WO2016/087086
PCT Pub. Date: Jun. 9, 2016

(65) Prior Publication Data
US 2017/0271695 A1     Sep. 21, 2017

(30) Foreign Application Priority Data
Dec. 2, 2014 (DE) ............... 10 2014 224 574.5

(51) Int. Cl.
*H01M 8/04303* (2016.01)
*H01M 8/04223* (2016.01)
(Continued)

(52) U.S. Cl.
CPC ... *H01M 8/04303* (2016.02); *H01M 8/04223* (2013.01); *H01M 8/04753* (2013.01);
(Continued)

(58) Field of Classification Search
CPC ................................ H01M 8/04303
See application file for complete search history.

(56) References Cited

U.S. PATENT DOCUMENTS

| | | | | |
|---|---|---|---|---|
| 2002/0136939 A1* | 9/2002 | Grieve | ........... | H01M 8/04089 429/415 |
| 2003/0134164 A1* | 7/2003 | Reiser | ........... | H01M 8/04228 429/415 |

(Continued)

FOREIGN PATENT DOCUMENTS

| | | |
|---|---|---|
| JP | 2000036308 A | 2/2000 |
| JP | 2001357866 A | 12/2001 |

(Continued)

OTHER PUBLICATIONS

Definitions (Year: 2020).*

(Continued)

*Primary Examiner* — Brian R Ohara
(74) *Attorney, Agent, or Firm* — Michael Best & Friedrich LLP

(57) ABSTRACT

The invention relates to a fuel cell system (100, 1) comprising: at least one fuel cell (200) which has a cathode (230) with a cathode chamber and has an anode chamber of an anode (210), which anode chamber is separated from the cathode chamber by a membrane, wherein the cathode chamber is connected to a cathode gas source via at least one first fluid connection (240) and the anode chamber is connected to an anode gas source via at least one second fluid connection; and comprising a first electrical connection (3) to a DC/DC converter (450) that electrically connects the anode (210) and the cathode (230) to an energy system (400), wherein in a shut-down phase of the fuel cell system (100, 1), residual energy present in the fuel cell (200) can be discharged. According to the invention, the anode (210) is connected to the energy system (400) and/or the cathode (Continued)

(230) via at least one second electrical connection (2), wherein the second electrical connection (2) is a bypass connection to the DC/DC converter (450) and/or the second electrical connection (2) is a bypass connection parallel to the fuel cell (200), wherein at least the residual energy can be discharged via the second electrical connection (2), and the second electrical connection (2) comprises a resistor (6).

12 Claims, 9 Drawing Sheets

(51) Int. Cl.
*H01M 8/04746* (2016.01)
*H01M 8/04858* (2016.01)
*H02M 3/00* (2006.01)

(52) U.S. Cl.
CPC .... *H01M 8/04873* (2013.01); *H01M 2250/20* (2013.01); *H02M 3/00* (2013.01); *Y02T 90/40* (2013.01)

(56) References Cited

U.S. PATENT DOCUMENTS

| | | | |
|---|---|---|---|
| 2006/0124368 A1* | 6/2006 | Plishner | B60L 15/20 180/65.6 |
| 2007/0087232 A1* | 4/2007 | Robin | H01M 8/04597 429/429 |
| 2008/0038602 A1* | 2/2008 | Yu | H01M 8/2457 429/415 |
| 2010/0167144 A1* | 7/2010 | Kaito | H01M 8/04231 429/429 |
| 2010/0323259 A1 | 12/2010 | Sung et al. | |
| 2011/0229783 A1* | 9/2011 | Robb | H01M 8/2483 429/432 |
| 2016/0103186 A1* | 4/2016 | Hong | H01M 10/425 324/430 |
| 2016/0149241 A1* | 5/2016 | Kim | H01M 8/04664 429/429 |
| 2017/0324103 A1* | 11/2017 | Matsuyama | H01M 8/04567 |

FOREIGN PATENT DOCUMENTS

| | | |
|---|---|---|
| JP | 2006236799 A | 9/2006 |
| JP | 2008066106 A | 3/2008 |
| JP | 2008091319 A | 4/2008 |
| JP | 2012095446 A | 5/2012 |
| WO | 2005104284 | 11/2005 |
| WO | 2015048896 | 4/2015 |

OTHER PUBLICATIONS

International Search Report for Application No. PCT/EP2015/072894 dated Nov. 25, 2015 (English Translation, 2 pages).

\* cited by examiner

INTRINSICALLY SAFE BLEED-DOWN CIRCUIT AND CONTROL STRATEGY FOR FUEL CELL SYSTEMS

BRIEF DESCRIPTION OF THE DRAWINGS

The present invention relates to a fuel cell system and to a method for shutting down a fuel cell system.

Generic fuel cell systems are typically used in mobile applications or in vehicles and in particular in motor vehicles. In so doing, cold combustion of hydrogen as a result of the hydrogen coming into contact with oxygen occurs in the fuel cell or in the fuel cell stack that are included in the fuel cell system, wherein the oxygen normally originates from the circulating air. The hydrogen or oxygen is directed by way of fluid connections to an anode chamber of an anode or to a cathode chamber of a cathode of a fuel cell, wherein the anode chamber and the cathode chamber are separated from one another by way of a membrane. In addition to the electrical energy, waste water and waste heat are also produced during the combustion of hydrogen as a result of the hydrogen coming into contact with oxygen, wherein the waste heat is typically discharged by way of a thermal circuit to a vehicle radiator.

Figure 2:
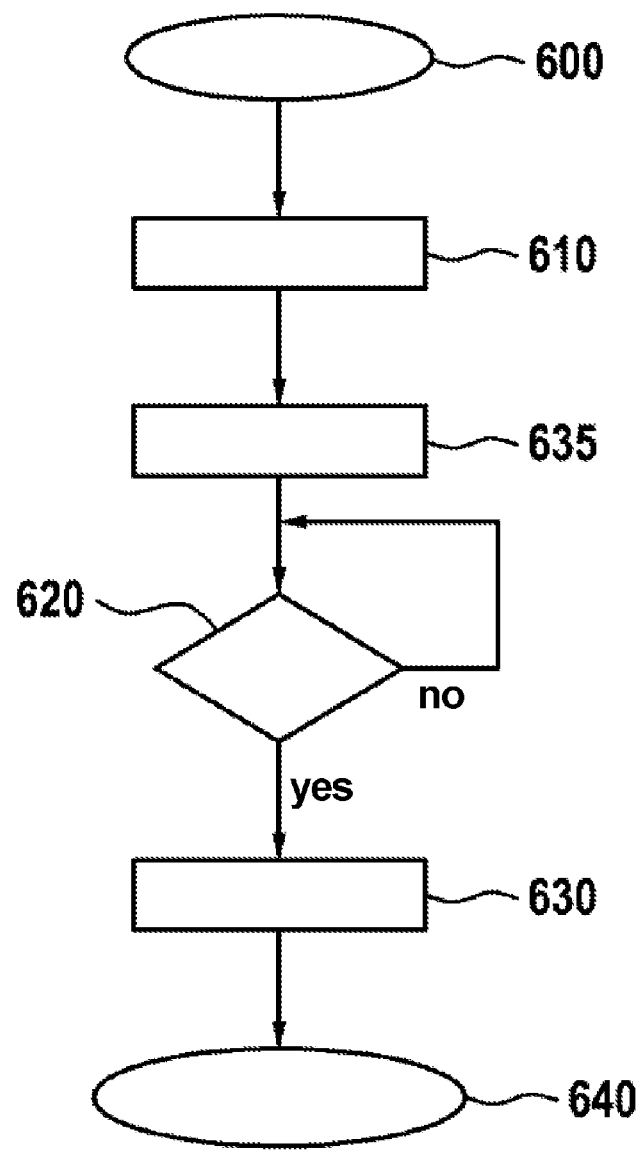

An operating strategy for the bleed-down switching circuit of the prior art is illustrated in FIG. 2. It is evident that the bleed-down switch is closed on a time basis in order to cause sufficient oxygen to be consumed. The bleed-down period of time can be variable in that the fuel cell stack voltage is measured and upon achieving a lower threshold the bleed-down switching circuit in other words the procedure is terminated. It is also known to integrate the bleed-down switch or the bleed-down resistor in a DC/DC converter that transforms the electrical energy originating from the fuel cell stack and supplies said energy to a traction rechargeable battery, a low voltage battery or an inverter so as to drive by way of example an electric motor of a motor vehicle. Since the electric voltage of the fuel cell stack greatly varies in part with the electrical loading, the DC/DC converter that is connected downstream of the fuel cell stack is also responsible for stabilizing the voltage of the vehicle electrical system of the motor vehicle.

It follows from this that it is known that the fuel cell stack is activated after the current supply to the battery cell system has been shut off In so doing, the diffusion of air in the cathode causes a buildup of fuel cell stack voltage, wherein the damaging open circuit voltage (OCV) is achieved and this is possibly maintained for a number of hours. The open circuit voltage leads to the fuel cell stack being damaged. Because of this, it is known to reduce the voltage at the fuel cell stack by means of the bleed-down switch and only to activate the fuel cell stack after the open circuit voltage has been reduced. As is generally known, the bleed-down switch is embodied for reasons of safety as a NO (normally open) switch in order in the normal operation to avoid by way of example an undesired short circuit of the fuel cell stack in the event that there is a voltage failure or cable break at the switch or if the switch is continuously energized, which would lead to energy losses. In addition, in the case of the known systems, the air supply to the cathode chamber is embodied by means of an air-tight blocking arrangement, such as by way of example by means of non-return valves. As a consequence, it is possible over a particular period of time, in other words over a number of hours, in dependence upon the design of the non-return valve and the length of the cathode outlet, to avoid the fuel cell stack voltage being reduced. It is a disadvantage of this design that the non-return valves are not permanently leak-proof since they are exposed to great changes in temperature and pressure during the operation of the fuel cell system. It is accordingly not possible to prevent the damaging open circuit voltage (OCV) occurring during longer lifetimes of the fuel cell system owing to the non-return valves not been leak-proof. In addition to the additional components that must be arranged in the cathode path so as to provide an air-tight blocking arrangement of the cathode, system costs are also increased owing to the increased pressure loss in the cathode path which has a negative effect on the design and costs of the air compressor. Moreover, it is possible for condensation water in the non-return valves to freeze in the case of operating temperatures below the freezing point and as a result for said non-return valves to become inoperable owing to sticking.

SUMMARY OF THE INVENTION

It is thus the object of the present invention to eliminate at least in part the disadvantages that are known from the prior art. So as to prevent increased system costs in the case of fuel cell systems and so as to avoid damage to the fuel cell stack as a result of a damaging open circuit voltage, it is in particular the object of the present invention to achieve a simple and nonetheless safe construction of the fuel cell system that in the case of an open circuit reliably solves in particular the above mentioned problems.

The above mentioned object is achieved by means of a fuel cell system and also by means of a method. Further advantages, features and details of the invention are disclosed in the description and the drawings. In so doing, features and details apply that are described in conjunction with the fuel cell system in accordance with the invention for shutting down a fuel cell system, it goes without saying that said features and details are also described in conjunction with the method in accordance with the invention, so that with respect to the disclosure reference is made or can be made continuously in an alternating manner to the individual aspects of the invention.

In accordance with the invention, the fuel cell system comprises at least one fuel cell having a cathode with a cathode chamber and said fuel cell having an anode chamber of an anode, said anode chamber being separated from the cathode chamber by a membrane, wherein the cathode chamber is connected to a cathode gas source by way of at least one first fluid connection and the anode chamber is connected to an anode gas source by way of at least one second fluid connection; and comprising a first electrical connection to a DC/DC converter that electrically connects the anode and the cathode to an energy system, wherein in a shut-down phase of the fuel cell system residual energy present in the fuel cell can be discharged. In so doing, it is provided in accordance with the invention that the anode is connected to the energy system and/or to the cathode by way of at least one second electrical connection, wherein the second electrical connection is a bypass connection to the DC/DC converter and/or the second electrical connection is a bypass connection in parallel with the fuel cell, wherein at least the residual energy can be discharged by way of the second electrical connection and wherein at least the bypass connection parallel with the fuel cell comprises a resistor.

It is advantageous in the case of the embodiment of the second electrical connection corresponding to the first alternative of the fuel cell system in accordance with the invention, wherein said second electrical connection bypasses the DC/DC converter and thus continuously discharges energy to the electrical circuit, in other words in particular to the vehicle electrical system, that the fuel cell stack is connected to the vehicle electrical system during the entire shut-down phase, and as a consequence energy is continuously discharged to by way of example a rechargeable battery in a safe and reliable manner so as to reduce the open circuit voltage, said rechargeable battery being arranged in the vehicle electrical system. The second alternative of the system in accordance with the invention for achieving the above described object, in which the second electrical connection is embodied as a bypass connection to the fuel cell having a resistor and by way of which the residual energy in the fuel cell is discharged, comprises the advantage that the residual energy is not discharged directly into the battery but rather is reliably and safely dissipated by the resistor. It is thus possible by means of the resistor that is preferably a high ohmic resistor to also discharge the residual energy that is produced as the shut-down phase of the fuel cell system is initiated or as the fuel cell is shut down independently of a rechargeable battery or a battery so that it is also possible in an advantageous manner for batteries that have a SOC (state of charge)=100% to be made safe in the electrical system. In addition, in the case of the second alternative of the solution in accordance with the invention, namely in the case of the embodiment of the second electrical connection having the resistor in parallel with the anode and the cathode, it is advantageous that the second electrical connection is completely independent of the electrical system, in particular from the drive train (e.g. with a battery or without a battery). The second electrical connection having the resistor in parallel with the fuel cell can therefore also be used independently of the voltage level of the electrical system or of the drive train, wherein said voltage level can be higher than 120 V and by way of example can be 400 V. Consequently, it is possible to dimension the bleed-down circuit, and in particular also the resistor, which in terms of the present invention is described as a bleed-down resistor, in an advantageous manner independently of the residual electrical system. By virtue of dimensioning the bleed-down circuit, namely in this case the second electrical connection, independently of the electrical system, it is possible preferably to arrange the second electrical line and in particular also the bleed-down resistor as a subsystem in the fuel cell or in the fuel cell stack. It is preferred that the second electrical connection and the bleed-down resistor can be embodied integral with the fuel cell or the fuel cell stack. It is possible to integrate the second electrical connection and in particular the bleed-down resistor in an advantageous manner in end plates of the fuel cell or of the fuel cell stack, wherein it is preferred that the second electrical connection and in particular also the bleed-down resistor are thermally connected to the fuel cell and/or the fuel cell stack.

In an advantageous manner, the residual energy is discharged so as to reduce the damaging open circuit voltage as the shut-down phase or switched-off phase of the fuel cell system is initiated, even before fluid connections are closed. In this respect, it is possible in the case of the fuel cell system in accordance with the invention for the residual energy that is produced by means of the fuel cell to be discharged by way of the second electrical connection as the shut-down phase is initiated and during the entire shut-down phase. This leads in an advantageous manner to the shut-down phase being shortened and in addition to an extension of the serviceable life of the fuel cell system in accordance with the invention since the damaging open circuit voltage is reduced as the shut-down phase is initiated and it is thus possible to avoid voltage peaks in a damaging open circuit voltage.

In an advantageous manner, the resistor that is arranged in the second electrical connection is a voltage-dependent resistor and/or a temperature-dependent resistor. If by way of example the second electrical connection is embodied as a bypass connection to the fuel cell stack, the residual energy that is produced as the shut-down phase is initiated or that is produced during the shut-down phase of the fuel cell leads to a parasitic power of the resistor that is arranged in the second electrical connection. In so doing, it is necessary by means of the resistor in the bypass connection for the parasitic power to be of such a magnitude that the gradual diffusion of oxygen into the cathode is compensated for by a continuously flowing low current. If the fuel cell stack comprises by way of example a stack voltage of a maximal 120 V, a parasitic power of the bypass resistor of 1.2 W is sufficient. This is calculated as follows: 120 V/12 k$\Omega$=10 mA leads to a parasitic power loss=120 V×10 mA=1.2 W. In order to reduce the bypass loss during the normal operation of the fuel cell, a voltage-dependent resistor (VDR) that has a high resistance value in the case of a voltage during the normal operation is in particular suitable in this case, which leads to small bypass losses during the normal operation, and said voltage-dependent resistor in the case of an open circuit voltage (OCV) being applied comprises a reduced resistance value and consequently prevents the damaging open circuit voltage. In the case of a maximum fuel cell stack voltage of 120 V, a parasitic energy loss=80 V×0.1 mA=0.008 W is produced when using a voltage-dependent resistor by way of example during the normal operation in the case of a power loss at 80 V. In the case of a power loss at 120 V, by way of example a parasitic energy loss=120 V×10 mA=1.2 W is produced. This parasitic energy loss is thus sufficient in order by means of the continuously flowing low current to compensate for the gradual diffusion of oxygen into the cathode.

A further advantageous variant is the embodiment of the resistor as a temperature-dependent resistor, in this case in particular as a positive temperature coefficient (PTC) resistor, wherein the resistor in an advantageous manner by means of the increase in its resistance value in the case of an increasing loading renders possible a intrinsically safe operation of the bypass connection, wherein in an advantageous manner the bypass is prevented from burning out and consequently the safety of the fuel cell system in accordance with the invention is increased overall.

If circuit breakers for disconnecting the fuel cell stack from the vehicle electrical system are not provided in the fuel cell system, e.g. in the case of a fuel cell stack voltage→less than 60 V or less than 120 V, the fuel cell stack is usually connected to the vehicle electrical system by way of the DC/DC converter. In this case, the bypass connection to the DC/DC converter is used in an advantageous manner for directing by way of the bypass connection to the DC/DC converter the residual energy that is produced during the shut-down phase and after the fuel cell or the fuel cell stack has been shut down. In an advantageous manner, a switch in particular a relay is arranged in this case in the bypass connection to the DC/DC converter, wherein the switch in a closed position connects the anode by way of the second electrical connection to the energy system, or when in an open position said switch disconnects the anode from the energy system. It is preferred that the switch is embodied as a NC (normally closed) relay that is used for connecting the fuel cell stack during the entire shut-down phase to the vehicle electrical system. As a consequence, it is guaranteed that the fuel cell stack discharges its energy continuously into the rechargeable battery during the entire shut-down phase.

So that the energy is only discharged from the fuel cell stack to the vehicle electrical system, in other words to the energy system, a diode is advantageously arranged in the second electrical connection, said diode preferably being connected downstream of the resistor, wherein said diode directs the residual energy only in the direction of the energy system. The diode in the second electrical connection accordingly ensures that the current is only discharged from the fuel cell stack into the energy system or into the vehicle electrical system, in other words the flow direction of the current does not change. If by way of example the voltage of the vehicle electrical system is greater than the voltage of the fuel cell stack, the diode that is arranged in the second electrical connection ensures that the flow direction of the current from the vehicle electrical system to the fuel cell stack is blocked. The resistor that is preferably connected upstream of the diode is used to limit the current. The embodiment of the second electrical connection with a resistor and a diode simplifies the bleed-down strategy in an advantageous manner since in comparison to the known systems and strategies it is not necessary to maintain a bleed-down period of time. As a consequence, the entire shut-down phase of the fuel cell system is reduced in an advantageous manner.

The bleed-down circuitry can preferably be further simplified in an advantageous manner, namely by virtue of embodying the second electrical connection without a switch (switch-free) or without a relay (relay-free). So as to embody a switch-free second electrical connection that comprises at least one resistor, the resistor is to be designed preferably in a high ohmic manner. The resistance value should be in a range from 3 k$\Omega$ to 6 k$\Omega$. It is preferred that the resistor comprises a resistance value of 4 k$\Omega$. A resistor that is designed for a 4 k$\Omega$ is advantageously sufficient to limit to a minimum the current that is flowing in the second electrical connection during the normal operation of the fuel cell system. The current that is discharged by way of the resistor, in other words the discharged energy, leads during the normal operation of the fuel cell system to a negligible, parasitic power of less than 0.4 W. If by way of example the fuel cell stack voltage comprises a value of maximal 120 V and if the battery voltage is at 80 V, then a current of 10 mA is produced according to the calculation: (120 V−80 V)/4 k$\Omega$. This produces a parasitic power loss of P=40 V×10 mA=0.4 W. This parasitic power of 0.4 W is sufficient to compensate for the gradual diffusion of oxygen into the cathode by means of a continuously low current. In comparison to the bypass connection to the DC/DC converter, wherein said bypass connection is embodied with a switch, preferably with an NC (normally closed) relay, the bleed-down strategy is significantly simplified by means of the switch-free second electrical connection.

As described for generic fuel cell systems, a non-return valve is arranged in the usual manner in the first fluid connection from the cathode gas source to the cathode chamber and said non-return valve is intended to prevent the further supply of oxygen into the cathode chamber as the fuel cell system is shut-down. In the usual manner, a third fluid connection that is embodied as an exhaust air duct and is connected to the cathode chamber also comprises a non-return valve so as to prevent cathode gas being directed into the cathode chamber by way of the exhaust gas duct. Since however in accordance with the invention by way of the second electrical connection that is either a bypass connection to the DC/DC converter or is embodied as a bypass connection in parallel with the fuel cell, a magnitude of energy is continuously discharged from the fuel cell or from the fuel cell stack that is sufficient to compensate for the gradual diffusion of oxygen into the cathode, it is possible in an advantageous manner to embody the first and/or the third fluid connection without a non-return valve. As a consequence, the advantage is produced in that it is possible to prevent the non-return valves sticking as a result of the condensation water that collects in the valve in the case of an operating temperature below the freezing point. In addition, it is possible to minimize a pressure loss by virtue of embodying the fluid connection in the cathode path without a non-return valve, as a consequence of which an air compressor that is connected in the first fluid connection upstream of the cathode chamber can be embodied with a lower capacity, whereby the system costs can be reduced overall.

The method in accordance with the invention for shutting down a fuel cell system, in particular the fuel cell system in accordance with the invention provides in a first step the initiation of the shut-down phase, wherein as the shut-down phase is initiated the residual energy that is present in the fuel cell is discharged to the energy system and/or the discharged energy is dissipated by way of the resistor. In a second step and/or in a step that is in parallel with the first step, the method in accordance with the invention provides to close the fluid connections between the anode and the anode gas source and between the cathode and the cathode gas source. In a third step, the method in accordance with the invention provides to shut down the fuel cell system after closing the fluid connections. Since in an advantageous manner by way of the switch that is embodied preferably as a NC (normally closed) relay in the second electrical connection to the DC/DC converter or by way of the high ohmic design of the resistor in the second electrical connection, which is embodied in an advantageous manner as a bypass in parallel with the fuel cell, as the shut-down phase is initiated the residual energy that is present in the fuel cell is discharged to the energy system or the discharged energy is dissipated by way of the resistor, it is possible in a second step or in a step that is in parallel with the first step to close the fluid connections between the anode and the anode gas source and between the cathode and the cathode gas source without the danger occurring that as a result of the non-discharged residual energy the fuel cell or the fuel cell stack becomes damaged as a result of the damaging open circuit voltage. In this respect, the fuel cell system can be shut down immediately after closing the fluid connections, as a result of which overall the shut-down phase or switched-off phase is simplified and in addition the duration of said phase shortened.

If the second electrical connection is embodied as a bypass connection in parallel with the fuel cell, it is advantageous by way of circuit breakers to disconnect the fuel cell or the fuel cell stack and the second electrical connection that is parallel therewith from the energy system or from the vehicle electrical system so as by way of example to ensure a discharge procedure and an OCV-free fuel cell stack even in the case of a battery having a SOC=100%. In addition, it is possible by way of disconnecting the fuel cell stack or the second electrical connection that is embodied in parallel with the fuel cell stack to embody a topology of the drive train (e.g. with a battery or without a battery) independently of the topology of the circuit. If therefore circuit breakers are embodied between the fuel cell stack and the vehicle electrical system or the energy system, the circuit breakers in the electrical connection between the fuel cell and the energy system are opened prior to the third step, namely preferably after closing the fluid connections. After opening the circuit breakers, it is then possible to shut-down the fuel cell system since the residual energy that occurs as a result of venting the residual gases that are still located in the cathode chamber and the anode chamber is discharged by way of the second electrical connection that is embodied as a bypass connection in parallel with the fuel cell and said residual energy is dissipated by way of the resistor that is arranged in the second electrical connection. By virtue of the advantageous high ohmic design of the resistor, it is possible to ensure that the gradual diffusion of oxygen into the cathode is compensated for by means of a continuously low current.

So as to avoid at this point any possible repetitions with respect to further advantages of the method in accordance with the invention, reference is made to the description of the advantageous embodiment of the fuel cell system in accordance with the invention and reference will be made in full thereto.

BRIEF DESCRIPTION OF THE DRAWINGS

Figure 1:
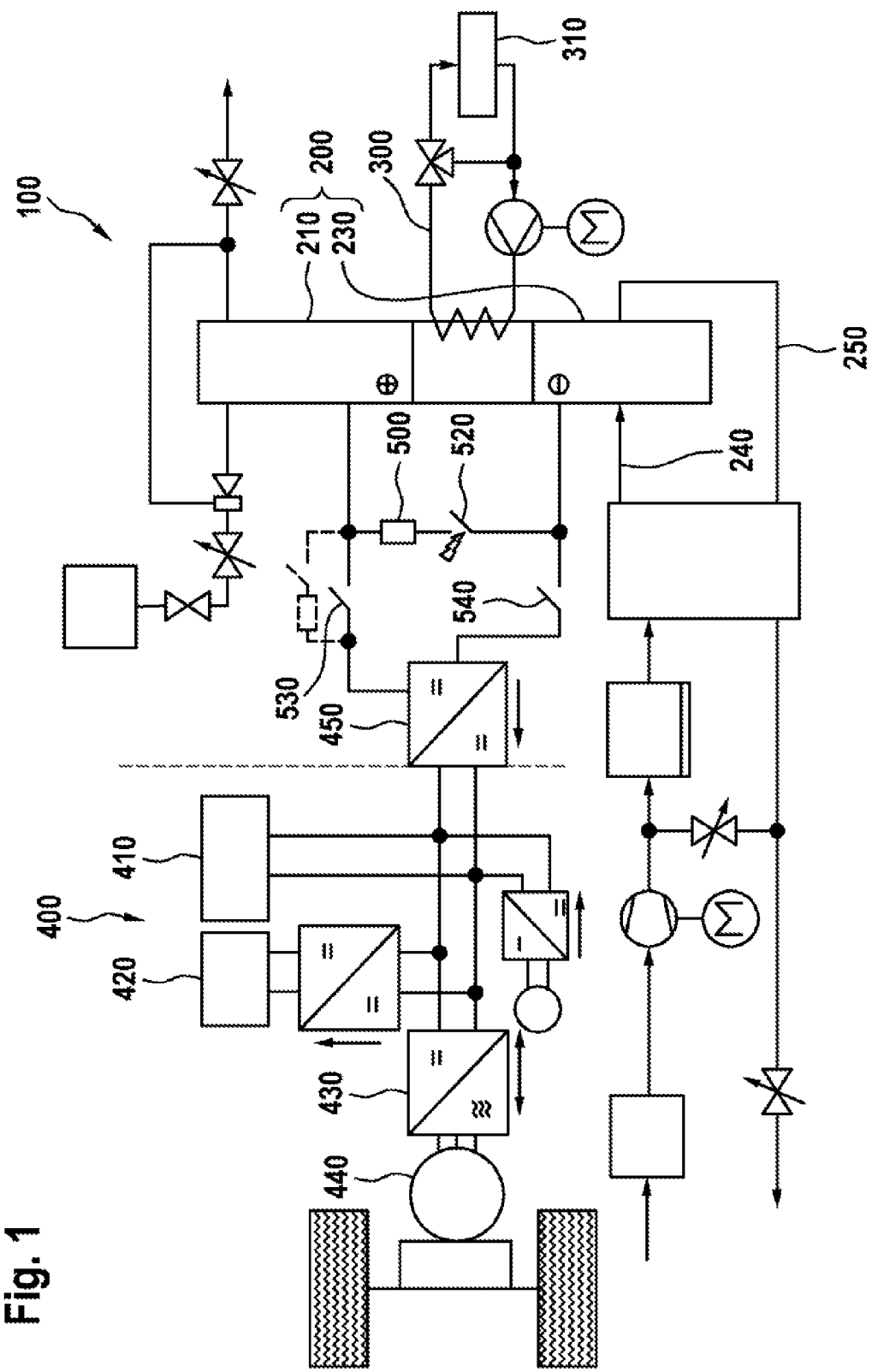
FIG. 1 illustrates a typical fuel cell system known in the prior art. An electrical circuit is illustrated on the left hand side of the fuel cell stack and the electrical energy that is supplied by the fuel cell system is discharged by way of said electrical circuit to a high voltage vehicle electrical system of a motor vehicle. A bleed-down switching circuit is connected upstream of the high voltage vehicle electrical system in the electrical circuit of the high voltage vehicle electrical system. The function of the bleed-down switching circuit is to reduce the energy of the fuel cell stack in a controlled manner as the fuel cell system is shut down. In addition to the bleed-down switch, the bleed-down switching circuit comprises a resistor. In order to reduce the electrical energy of the fuel cell stack as the fuel cell system is shut down, the bleed-down switch is closed after the hydrogen or oxygen supply is shut off so that the residual oxygen still remaining in the cathode is vented with the hydrogen that is still present in the anode. The controlled reduction of energy leads to the cell voltage being reduced so that the open circuit voltage (OCV) that is damaging for the fuel cell stack is avoided.
Figure 3:
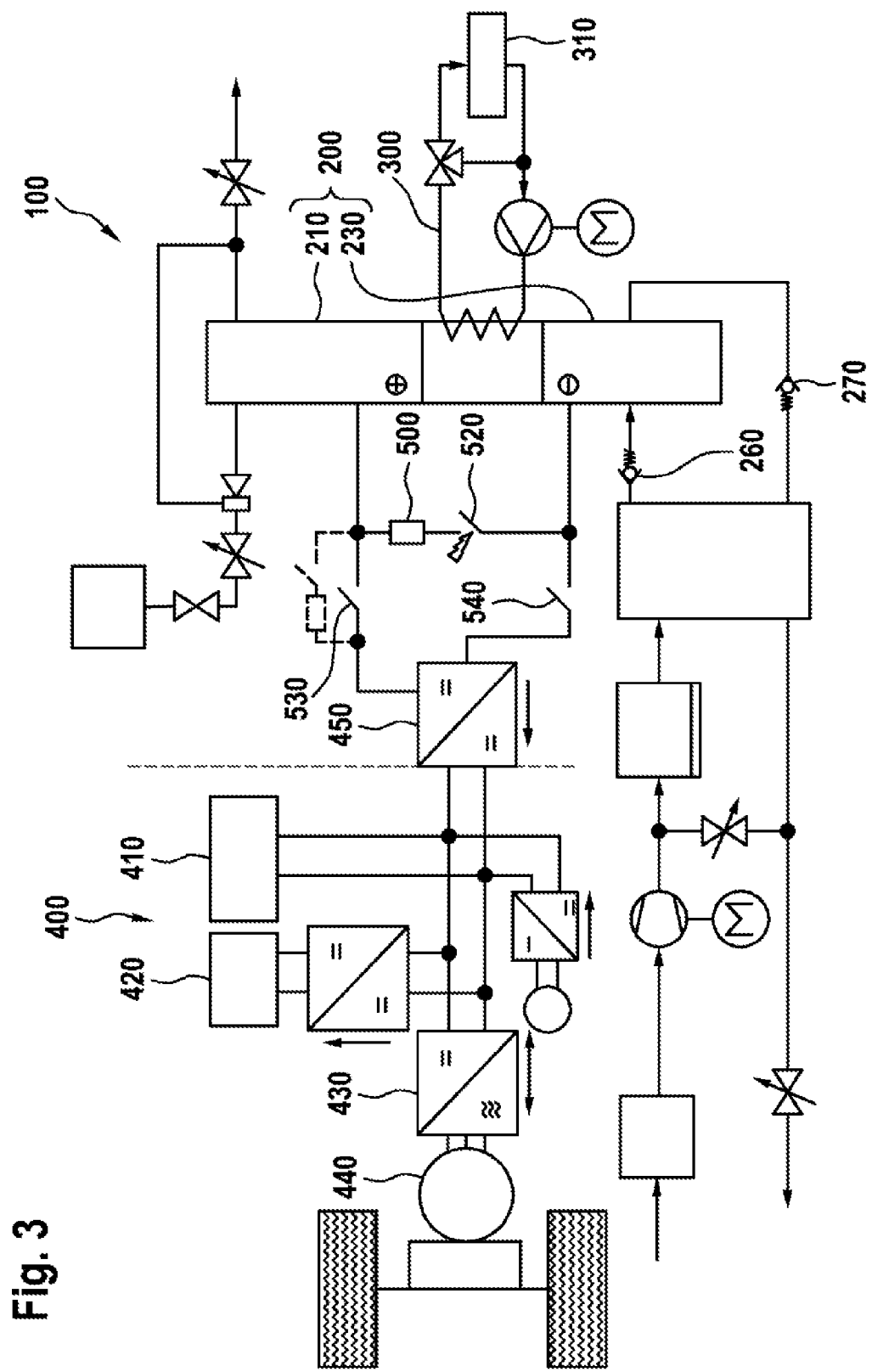
Figure 4:
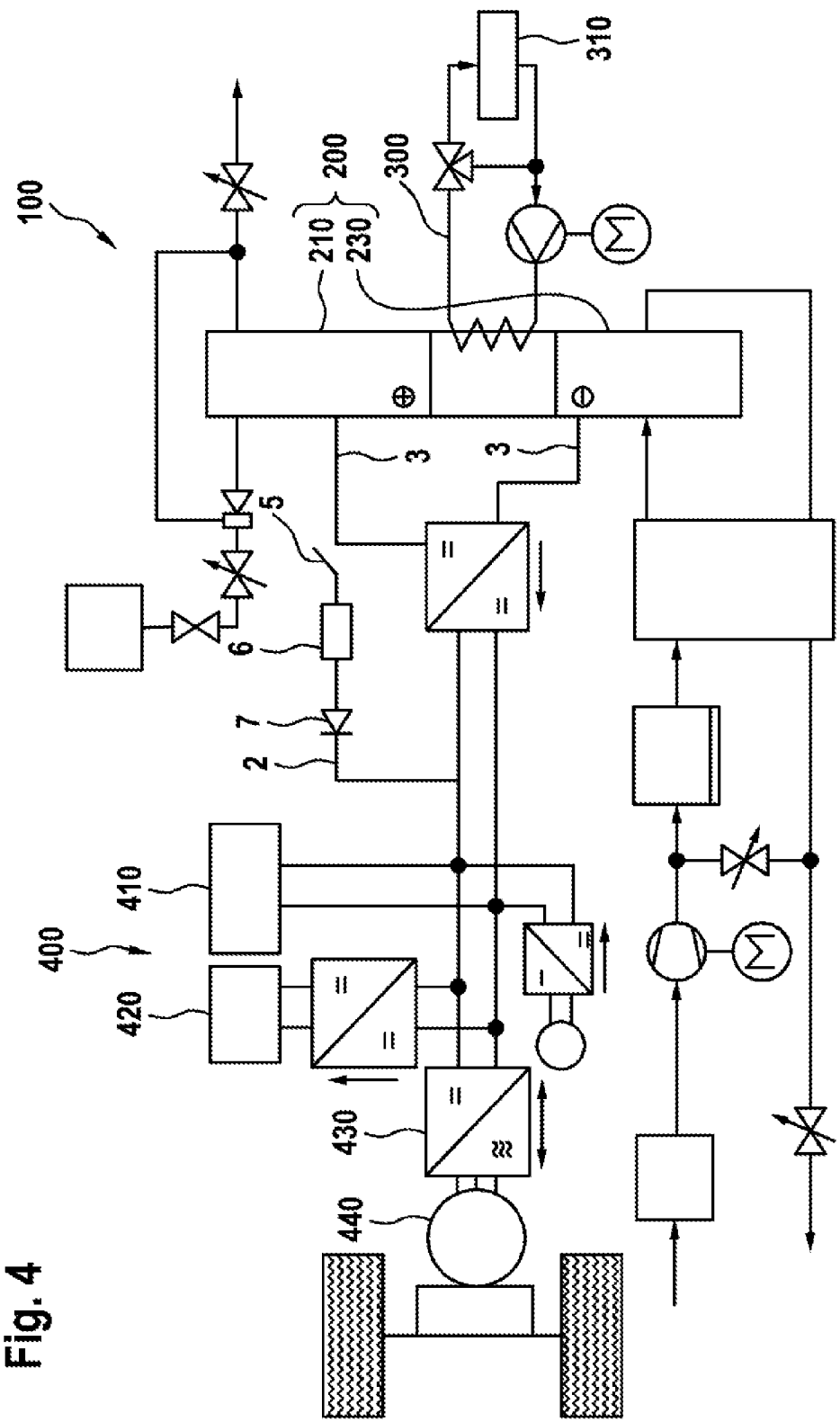
Figure 5:
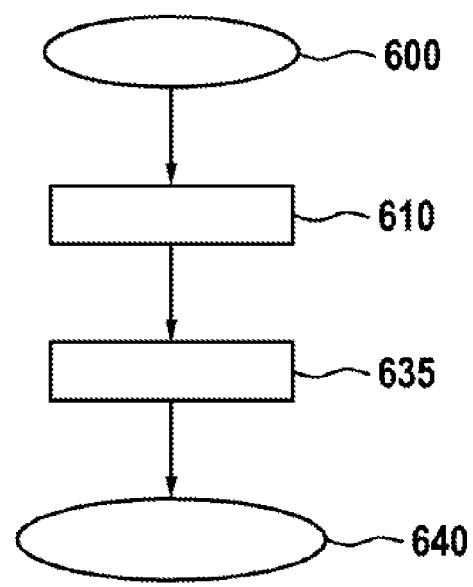
Figure 6:
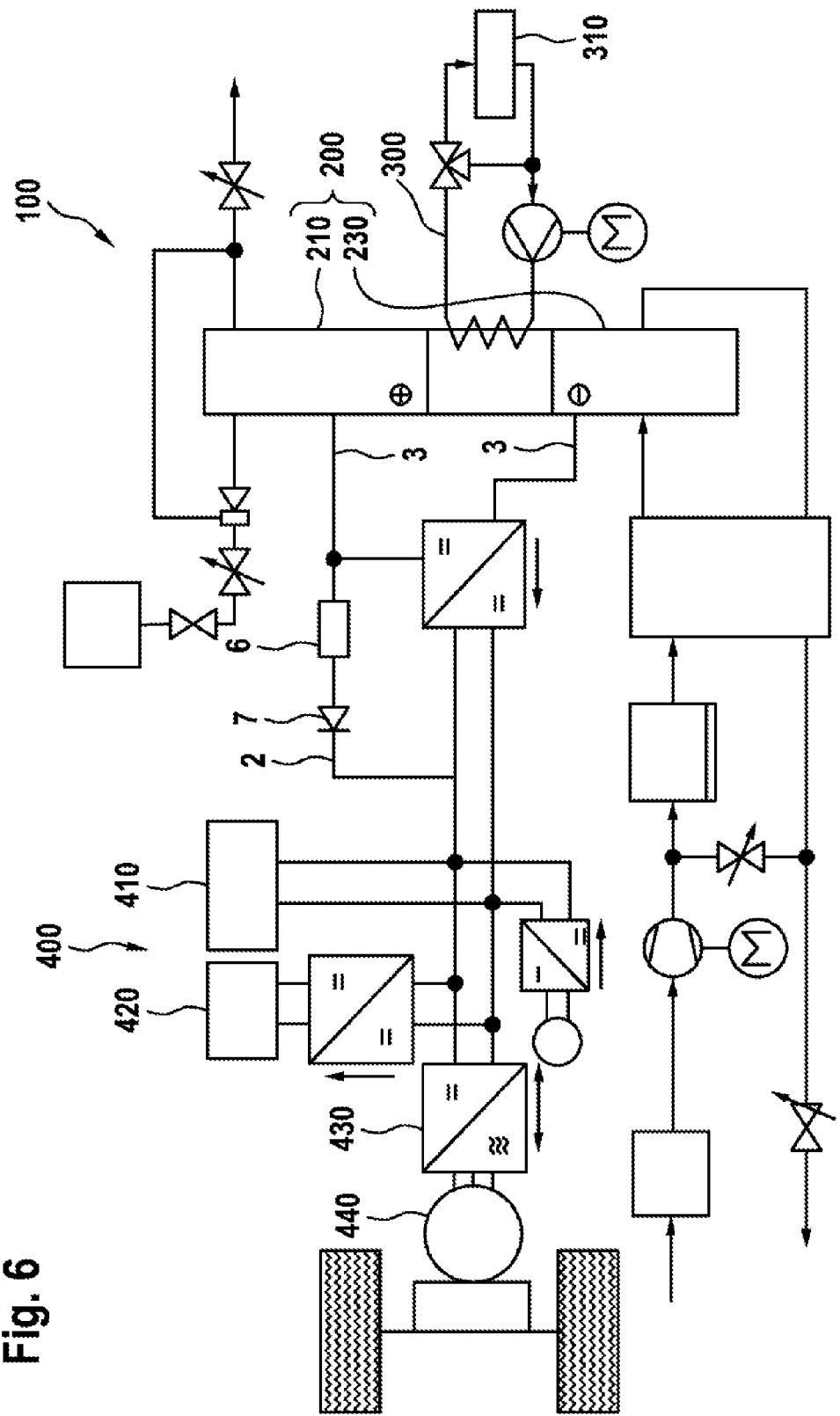
Figure 7:
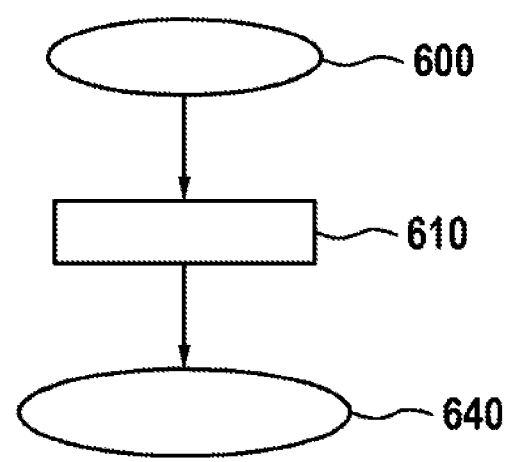
Figure 8:
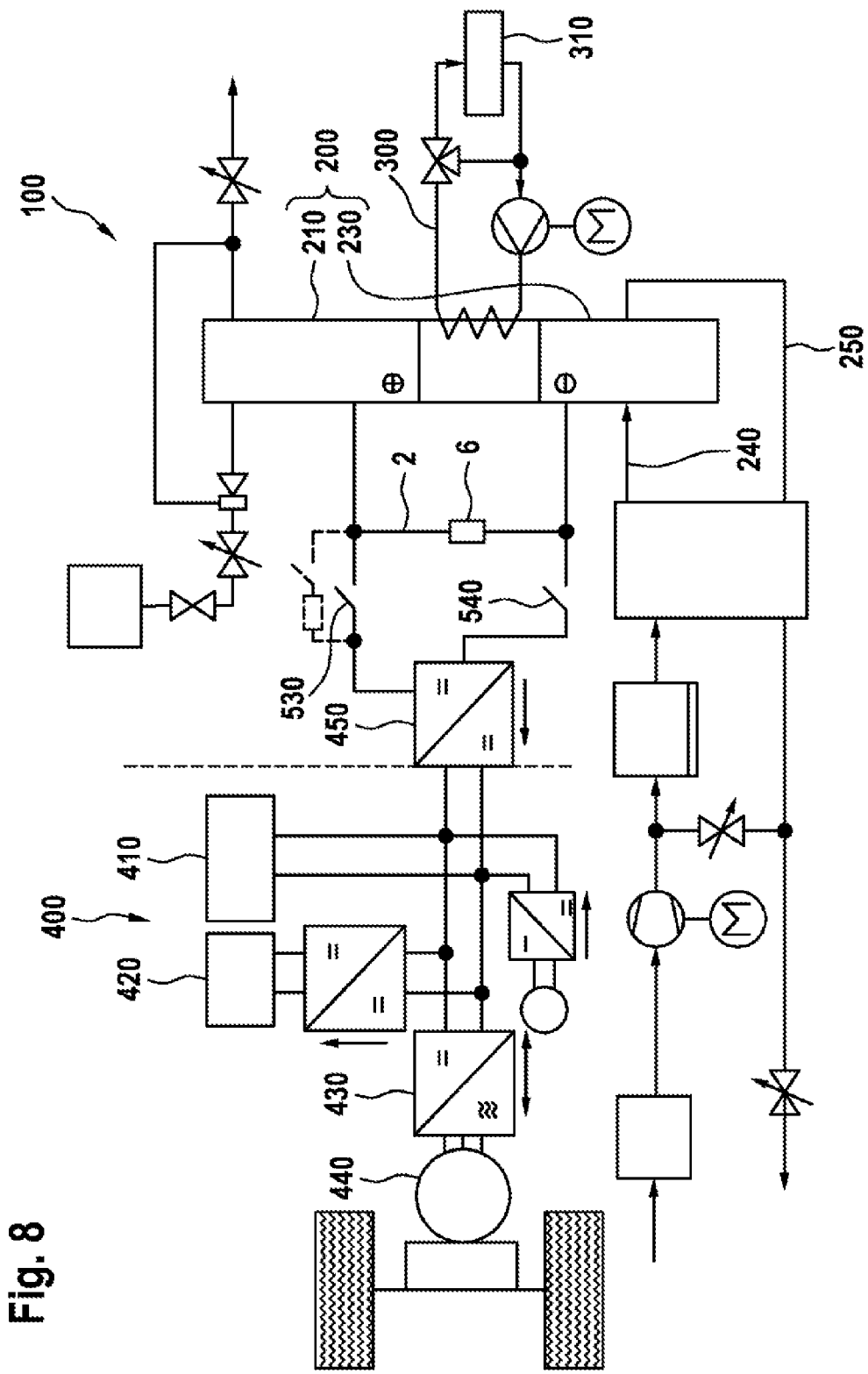
Figure 9:
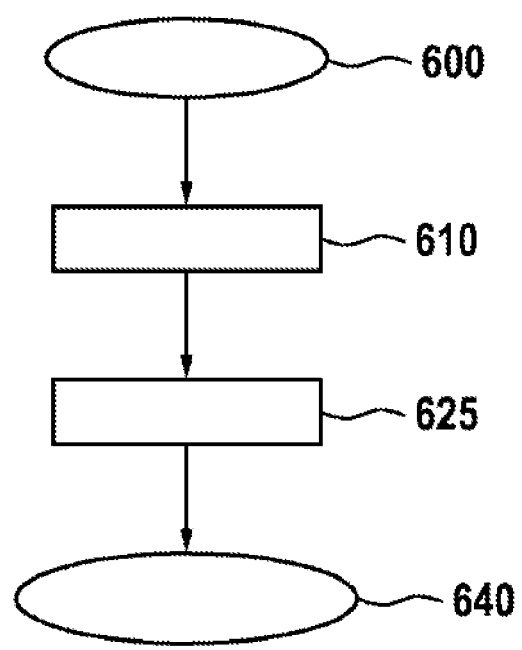

Further features that improve the invention are illustrated in detail hereinunder in the description of preferred exemplary embodiments of the invention with the aid of the figures. The features mentioned in the claims and in the description are in each case essential for the invention either on an individual basis or in any combination. It is to be noted that the figures are merely of a descriptive nature and are not intended to limit the invention in any form. In the drawings:

FIG. 1 illustrates a schematic outline of an embodiment of a generic fuel cell system having a bleed-down switching circuit, FIG. 2 a flow diagram of an operating strategy for the bleed-down of the generic fuel cell system according to FIG. 1, FIG. 3 illustrates a schematic outline of an embodiment of a generic fuel cell system having non-return valves in the cathode path, FIG. 4 illustrates a schematic outline of any embodiment of a fuel cell system in accordance with the invention having a second electrical connection that is embodied as a bypass connection to the DC/DC converter, FIG. 5 illustrates a flow diagram of an operating strategy for the bleed-down of the fuel cell system in accordance with the invention according to FIG. 4, FIG. 6 illustrates a schematic outline of an embodiment of a fuel cell system in accordance with the invention having a switch-free bypass connection to the DC/DC converter, FIG. 7 illustrates a flow diagram of the operating strategy for the bleed-down of the fuel cell according to 6, FIG. 8 illustrates a schematic outline of an embodiment of a fuel cell system in accordance with the invention having a second electrical connection that is embodied as a bypass connection in parallel with the fuel cell and FIG. 9 illustrates a flow diagram of the operating strategy for the bleed-down of the fuel cell system in accordance with the invention according to FIG. 8.

DETAILED DESCRIPTION

Like parts in the different figures are always provided with the identical reference numeral and for this reason are generally described only once.

FIG. 1 illustrates in a schematic outline an embodiment of a fuel cell system 100 in accordance with the invention, said fuel cell system being embodied in an advantageous manner for mobile applications. The cold combustion of hydrogen occurs in the fuel cell 200 or the fuel cell stack as a result of the hydrogen coming into contact with oxygen that usually originates from the circulating air.

Fuel from a fuel tank 220 is supplied to the anode 210 of the fuel cell 200 or of the fuel cell stack. The fuel is usually hydrogen that is stored under high pressure in the fuel tank that is embodied as a high pressure hydrogen tank. The cathode 230 or the cathode chamber of the fuel cell 200 is supplied with air from the circulating air by way of a fluid connection 240. Exhaust air is discharged from the cathode 230 or the cathode chamber by way of a further fluid connection 250. The waste heat that is produced in addition to the electrical energy and waste air during the cold combustion process is directed to the vehicle radiator 310 by means of a thermal circuit 300. The energy system 400, in other words the electrical circuit, is illustrated in the FIG. 1 on the left hand side of the fuel cell 200. The energy system 400 is usually a vehicle electrical system of a vehicle, in particular the vehicle electrical system of a motor vehicle. A bleed-down switching circuit 500 is embodied in parallel with the electrical energy system 400 and in parallel with the fuel cell 200 or the fuel cell stack. The bleed-down switching circuit 500 comprises a resistor 510 and a switch 520. The main function of the bleed-down switching circuit 500 is to reduce the energy in the fuel cell 200 in a controlled manner as the fuel cell system 100 is shut down. For this purpose, the switch 520 is closed during the shut-down procedure after shutting off the supply of fuel and air so that the residual cathode gas that is still present in the cathode 230 and that is preferably oxygen is vented with the fuel that is still present in the anode 210 and that is preferably hydrogen. This leads to the cell voltage that is produced by means of the combustion of the residual gases that remain in the anode 210 and the cathode 230 being reduced so that an open circuit voltage (OCV) that is damaging for the fuel cell 200 or for the fuel cell stack is no longer present. A DC/DC converter is connected upstream of the electrical system 400, as illustrated in FIG. 1, and said DC/DC converter transforms the electrical energy that is supplied by the fuel cell 200 or the fuel cell stack and said DC/DC converter delivers this energy to a traction rechargeable battery 410, a low voltage battery 420 or to an inverter 430 that drives an electric motor 440 or a motor vehicle. Since the electrical voltage of the fuel cell 200 or of the fuel cell stack greatly varies in part with the electrical loading, the DC/DC converter 450 that is connected downstream of the fuel cell 200 is responsible for stabilizing the voltage of the vehicle electrical system. The bleed-down switching circuit 500 is embodied as a short circuit, wherein the switch 520 is a short circuit switch. Furthermore, the bleed-down switching circuit 500 is connected to the DC/DC converter 450 by way of circuit breakers 530 and 540. As a result of the bleed-down switching circuit 500, the fuel cell 200 or the fuel cell stack is only connected to the DC/DC converter 450 and thus to the energy system 400 if the current requirement at the fuel cell 200 is so high that the voltage of the fuel cell 200 is sufficiently low. The preparation for the switchover is then preferably performed with the switch 520 that is embodied as a short circuit switch and also with the circuit breakers 530 and 540.

FIG. 2 illustrates a flow diagram of an operating strategy for the bleed-down of the generic fuel cell system 100 in accordance with FIG. 1. In a first step, a shut-down phase (block 600) of the fuel cell system 100 is initiated, wherein it is assumed that current is not being supplied from the fuel cell 200 into the energy system 400. After initiating the shut-down phase (block 600), the gas supply is shut off (block 610), namely the supply of cathode gas or anode gas is shut off. Subsequently the fuel cell 200 is short circuited (block 620), in that the switch 520 that is embodied as a short circuit switch closes the bleed-down switching circuit 500 (635). In so doing the bleed-down switching circuit 500 is closed by way of the switch 520 (635) on a time basis. As a consequence, sufficient consumption of the cathode gas is to be achieved. In so doing, the bleed-down period of time can be variable, wherein it is necessary to measure the fuel cell voltage (block 620) and to achieve a lower threshold so that the bleed-down switch 520 is returned to its open position (block 630). If however the lower threshold is not achieved, the bleed-down switch remains closed. If however the lower threshold is achieved the bleed-down switch 520 is opened and the system is shut down (block 640).

FIG. 3 illustrates a schematic outline of an embodiment of a generic fuel cell system 100 according to the current prior art having a cathode path that comprises the fluid connection 240 and 250, wherein non-return valves 260 and 270 are embodied in the cathode path. The fuel cell 200 or the fuel cell stack is activated after the fuel cell system 100 is de-energized. The diffusion of air into the cathode 230 causes the fuel cell voltage and the OCV to buildup and this buildup can possibly be sustained for a number of hours, which leads fundamentally to the fuel cell 200 or the fuel cell stack becoming damaged. The bleed-down switch 520 is therefore closed, wherein the voltage is reduced at the fuel cell 200 by virtue of short circuiting the bleed-down switching circuit 500 and the fuel cell 200 or the fuel cell stack is only subsequently activated. The bleed-down switch 520 is usually embodied for safety reasons as an NO (normally open) switch. This embodiment prevents an undesired short circuit of the fuel cell 200 or of the fuel cell stack in the event of a voltage failure or cable break at the switch 520 and reduces the duration of the continuous energizing of the switch 520, which would lead to energy losses during the normal operation. In addition to the fuel cell system 100 illustrated in FIG. 1, an air-tight blocking arrangement of the shut-off of the cathode 230 is provided in the case of the current fuel cell systems 100. It is preferred that said air-tight blocking arrangement is provided, as illustrated in FIG. 3, by virtue of arranging non-return valves 260 and 270 in the fluid connections 240 and 250 that in the cathode path lead to the cathode 230 or lead away from the cathode 230. By virtue of arranging the non-return valves 260 and 270 in the cathode path, it is possible over a particular period of time or over a number of hours, independently of the design of the non-return valves 260 and 270 and the cathode outlet path, in other words the fluid connection 250, to prevent the fuel cell voltage building back up. However, the non-return valves 260 and 270 are not permanently leak-proof, in particular in the case of temperature and pressure changes in the cathode path. It is therefore not possible to prevent a damaging open circuit voltage, in other words an OCV, occurring again during longer lifetimes of the fuel cell system 100. In addition, the additional non-return valves 260 and 270 are encumbered with disadvantages with respect to the system costs since increased pressure losses are to be expected in the cathode path and this has a negative influence on the design and costs of the air compressor that is usually connected in the fluid connection 260 upstream of the cathode chamber of the cathode 230. In addition, it is possible for the function of the non-return valves 260 and 270 to be impaired as a result of their sticking in the case of operating temperatures below freezing point.

FIG. 4 illustrates a schematic outline of an embodiment of a fuel cell system 1 in accordance with the invention having a second electrical connection 2 that is embodied as a bypass connection to the DC/DC converter 450. As also already illustrated for the generic fuel cell system 100, as illustrated in the FIGS. 1 and 3, a fuel cell 200 or a fuel cell stack is connected by way of the DC/DC converter 450 to an energy system 400, wherein said energy system can be by way of example a vehicle electrical system of a vehicle and preferably a vehicle electrical system of a motor vehicle. The anode 210 and the cathode 230 are electrically connected in the present case to the energy system 400 by way of a first electrical connection 3, in which the DC/DC converter 450 is arranged. In accordance with the invention, the anode 210 is connected by way of at least the second electrical connection 2 to the energy system 400. The second electrical connection 2 is embodied as described as a bypass connection to the DC/DC converter 450. A switch 5 is embodied between the first electrical connection 3 and the second electrical connection 2, said switch preferably being an NC (normally closed) relay. The switch 5 is used for the purpose of connecting the fuel cell 200 or a fuel cell stack during the entire shut-down phase to the energy system 400. In addition, a resistor 6 is arranged in the second electrical connection 2 downstream of the switch 5 and said resistor is used so as to limit the current that is discharged from the fuel cell 200. Since the switch 5 is preferably embodied as an NC (normally closed) relay, the fuel cell 200 or a fuel cell stack discharges its energy during the entire shut-down or switched-off phase by way of example into the battery 420 that is arranged in the energy system 400. A diode 7 that is connected in the present case downstream of the resistor 6 in the second electrical connection 2 to the energy system 400 ensures that the flow direction of the current that is flowing in the direction from the fuel cell 200 towards the energy system 400 cannot be reversed. In the event that by way of example the voltage of the energy system 400 is greater than the fuel cell voltage, the diode 7 ensures that the current flow is interrupted. By virtue of embodying the fuel cell system 1 in accordance with the invention, the operating strategy for the bleed-down is simplified, as illustrated in FIG. 5.

As is illustrated in FIG. 5 in the flow diagram of the operating strategy for the bleed-down of the fuel cell system 1 in accordance with the invention according to FIG. 4, it is not necessary to maintain a bleed-down period of time and as a result the shut-down phase is shortened overall for the fuel cell system 1 in accordance with the invention. In so doing, the bleed-down switch 5 in the second electrical connection 2 is closed (block 635) after initiating the shut-down phase (block 600) and shutting off the gas supply (block 610) without measuring the fuel cell voltage (cf. block 620 in FIG. 2) directly after shutting off the gas supply (block 610). The system is subsequently shut down (block 640) as also illustrated for the operating strategy of the generic fuel cell system 100 in FIG. 2.

FIG. 6 illustrates in a schematic outline a variant of the fuel cell system 1 from FIG. 4. In the variant illustrated in FIG. 6, a switch is not provided in the second electrical connection 2 that is embodied as a bypass connection to the DC/DC converter 450. This simplified embodiment of the bleed-down switching circuit that is not provided with a switch requires that the resistor 6 is designed to be sufficiently high ohmic so that the bypass current during the normal operation of the fuel cell system 1 is limited to a minimum. If the resistor 6 is designed by way of example to 4 kΩ, a parasitic power loss of <0.4 W in the case of a fuel cell voltage 120 V and a battery voltage of 80 V is to be expected. However, the power of the resistor 6 at approx. 0.4 W is sufficient in order to compensate for a gradual diffusion of oxygen into the cathode 230 by virtue of a continuously low current. Accordingly, the fuel cell system 1, as illustrated in FIG. 6, and furthermore also the fuel cell system 1, as illustrated in FIG. 4, can be embodied in the cathode path without non-return valves, whereby it is possible to reduce the overall system costs.

FIG. 7 illustrates a flow diagram of an operating strategy of the variant illustrated in FIG. 6 of a fuel cell system 1 in accordance with the invention. The bleed-down strategy as described hereinunder is simplified by virtue of not providing a switch in the second electrical connection 2 that comprises the resistor 6. As also already illustrated in FIG. 5 in the flow diagram of the operating strategy for the bleed-down of the fuel cell system 1 in accordance with the invention according to FIG. 4, it is also not necessary in the case of the operating strategy for the fuel cell system 1 according to FIG. 6 to maintain a bleed down period of time. In addition, the block 635 as illustrated in FIG. 5 namely the closing of a bleed-down switch 5 in the second electrical connection 2 is omitted. Accordingly, it is possible to further reduce the shut-down phase overall by virtue of designing the bleed-down switching circuit without a switch, namely in this case preferably designing the second electrical connection 2 without a switch. It is therefore possible after initiating the shut-down phase (block 600) and the subsequent shutting off of the gas supply (block 610) to shut down the fuel cell system 1 directly (block 640).

FIG. 8 illustrates a schematic outline of a further variant of a fuel cell system 1 in accordance with the invention having a second electrical connection 2 that is arranged as a bypass connection in parallel with the fuel cell 200 or the fuel cell stack. This variant of the embodiment of the fuel cell system 1 in accordance with the invention comprises the advantage that the current is not discharged into the battery 420 of the energy system 400. By virtue of the second electrical connection 2 that is guided in parallel with the fuel cell 200, it is possible to ensure a discharge and an OCV-free fuel cell 2 even in the case of a battery having a SOC=100%. In addition, the bleed-down circuit can be used completely independently of the topology of the energy system 400 and is in addition also independent of the voltage level of the energy system 400. In order to compensate for a gradual diffusion of oxygen into the cathode 230 by means of a continuously low current, a resistor 6 is provided as a bypass resistor in the second electrical connection 2, wherein the current that is guided by way of the bypass resistor 6 preferably leads to a parasitic power of <1.2 W. This power is however sufficient in order to compensate for the gradual diffusion of oxygen into the cathode 230 by means of a continuously low current. However, the bypass losses during the normal operation of the fuel cell system 1 are greater than the bypass losses that occur in the variant of the fuel cell system 1 in accordance with the invention according to FIG. 6. The losses during the normal operation are however be reduced in that the resistor 6 is embodied as a voltage-dependent resistor 6. Another variant is the embodiment of the resistor 6 as a temperature-dependent resistor 6 (PTC resistor). As a result of the increase in the resistance value of the PTC resistor 6 in the case of an increasing loading, it is possible in an advantageous manner to ensure an intrinsically safe operation of the bleed-down switching circuit, namely of the second electrical connection 2 that is embodied as a bypass connection. The circuit breakers 530 and 540 that are used to connect or disconnect the first electrical connection 3 and the fuel cell 2 are to be considered optional, wherein the first electrical connection 3 leads by way of the DC/DC converter 450 to the energy system 400. This means that the first electrical connection 3 can also be embodied without circuit breakers 530 and 540.

FIG. 9 illustrates in a flow diagram the operating strategy for the bleed-down of the variant of the fuel cell system 1 in accordance with the invention according to FIG. 8. The operating strategy as illustrated in FIG. 9 differs from the operating strategy as illustrated in FIG. 7 merely by virtue of the fact that after shutting off the gas supply (block 610) the circuit breakers 530 and 540 are opened (block 625). If, as described in the case of the fuel cell system 1 in accordance with the invention according to the variant as illustrated in FIG. 8, the circuit breakers 530 and 540 are optionally not provided, the step of opening the circuit breakers (block 625) is omitted. The operating strategy for the fuel cell system 1 in accordance with the invention according to FIG. 8 but without the circuit breakers 530 and 540 is then identical to the operating strategy illustrated in FIG. 7.

The invention claimed is:

1. A fuel cell system (100, 1) having at least one fuel cell (200) having a cathode (230) with a cathode chamber and said fuel cell having an anode chamber of an anode (210), said anode chamber being separated from the cathode chamber by a membrane, wherein the cathode chamber is connected by way of at least one first fluid connection (240) to a cathode gas source and the anode chamber is connected by way of at least one second fluid connection to an anode gas source, and by a first electrical connection (3) to a DC/DC converter (450) that electrically connects the anode (210) and the cathode (230) to an energy system (400), wherein residual energy that is present in the fuel cell (200) in a shut-down phase of the fuel cell system (100,1) is discharged, characterized in that the anode (210) is connected by at least one second electrical connection (2) to the energy system (400) and/or the cathode (230), wherein the second electrical connection (2) is a bypass connection to the DC/DC converter (450) and/or the second electrical connection (2) is a bypass connection in parallel with the fuel cell (200), wherein at least the residual energy is discharged by way of the second electrical connection (2) and wherein the second electrical connection (2) comprises a resistor (6), wherein the bypass connection includes a bleed-down circuit including the resistor and wherein at least the residual energy is discharged by way of the bleed-down circuit, characterized in that a switch is not provided in at least the second electrical connection (2).

2. The fuel cell system as claimed in claim 1, characterized in that the resistor (6) that is arranged in the second electrical connection is a voltage-dependent resistor and a temperature-dependent resistor.

3. A fuel cell system (100, 1) having at least one fuel cell (200) having a cathode (230) with a cathode chamber and said fuel cell having an anode chamber of an anode (210), said anode chamber being separated from the cathode chamber by a membrane, wherein the cathode chamber is connected by way of at least one first fluid connection (240) to a cathode gas source and the anode chamber is connected by way of at least one second fluid connection to an anode gas source, and by a first electrical connection (3) to a DC/DC converter (450) that electrically connects the anode (210) and the cathode (230) to an energy system (400), wherein residual energy that is present in the fuel cell (200) in a shut-down phase of the fuel cell system (100, 1) is discharged, characterized in that the anode (210) is connected by at least one second electrical connection (2) to the energy system (400) and/or the cathode (230), wherein the second electrical connection (2) is a bypass connection to the DC/DC converter (450) and/or the second electrical connection (2) is a bypass connection in parallel with the fuel cell (200), wherein at least the residual energy is discharged by way of the second electrical connection (2) and wherein the second electrical connection (2) comprises a resistor (6), wherein the bypass connection includes a bleed-down circuit including the resistor and wherein at least the residual energy is discharged by way of the bleed-down circuit, characterized in that the second electrical connection (2) that is the bypass connection to the DC/DC converter (450) comprises a switch (5), wherein the switch (5) in a closed position connects the anode (210) by way of the second electrical connection (2) to the energy system (400) and/or in an open position disconnects the anode (210) from the energy system (400).

4. The fuel cell system (1) as claimed in claim 1, characterized in that the second electrical connection (2) comprises a diode (7) that is connected downstream of the resistor (6), and said diode directs the residual energy only in the direction of the energy system (400).

5. The fuel cell system (1) as claimed in claim 1, characterized in that by way of the second electrical connection (2) the residual energy is discharged past the DC/DC converter (450) to the energy system (400) and/or the resistor (6) dissipates the discharged residual energy.

6. The fuel cell system (1) as claimed in 1, characterized in that non-return valves are not provided in the first fluid connection (240) that connects the cathode chamber to the cathode gas source, and/or non-return valves are not provided in a third fluid connection (250) by way of which exhaust air can be discharged from the cathode chamber.

7. The fuel cell system (1) as claimed in claim 1, characterized in that the second electrical connection (2) is embodied as a bleed down circuit that is integrated into the end plates of the fuel cell (200) and/or of a fuel cell stack.

8. A method for shutting down a fuel cell system (1) as claimed in claim 1, wherein in a first step the shut-down phase is initiated and as the shut-down phase is initiated the residual energy that is present in the fuel cell (200) is discharged to the energy system (400) and/or the discharged energy is dissipated by way of a resistor (6), in a second step and/or a step that is in parallel with the first step the fluid connection between the anode and the anode gas source and the fluid connection (240) between the cathode and the cathode gas source are closed and in a third step the fuel cell system (1) is shut down after closing the fluid connections.

9. The method as claimed in claim 8, characterized in that prior to the third step circuit breakers (530, 540) in the first electrical connection (3) between the fuel cell (200) and the energy system (400) are opened.

10. The fuel cell system as claimed in claim 1, characterized in that the resistor (6) that is arranged in the second electrical connection is a voltage-dependent resistor.

11. The fuel cell system as claimed in claim 1, characterized in that the resistor (6) that is arranged in the second electrical connection is a temperature-dependent resistor.

12. The fuel cell system as claimed in claim 3, wherein the switch is a relay.

* * * * *